United States Patent Office 3,163,383
Patented Dec. 29, 1964

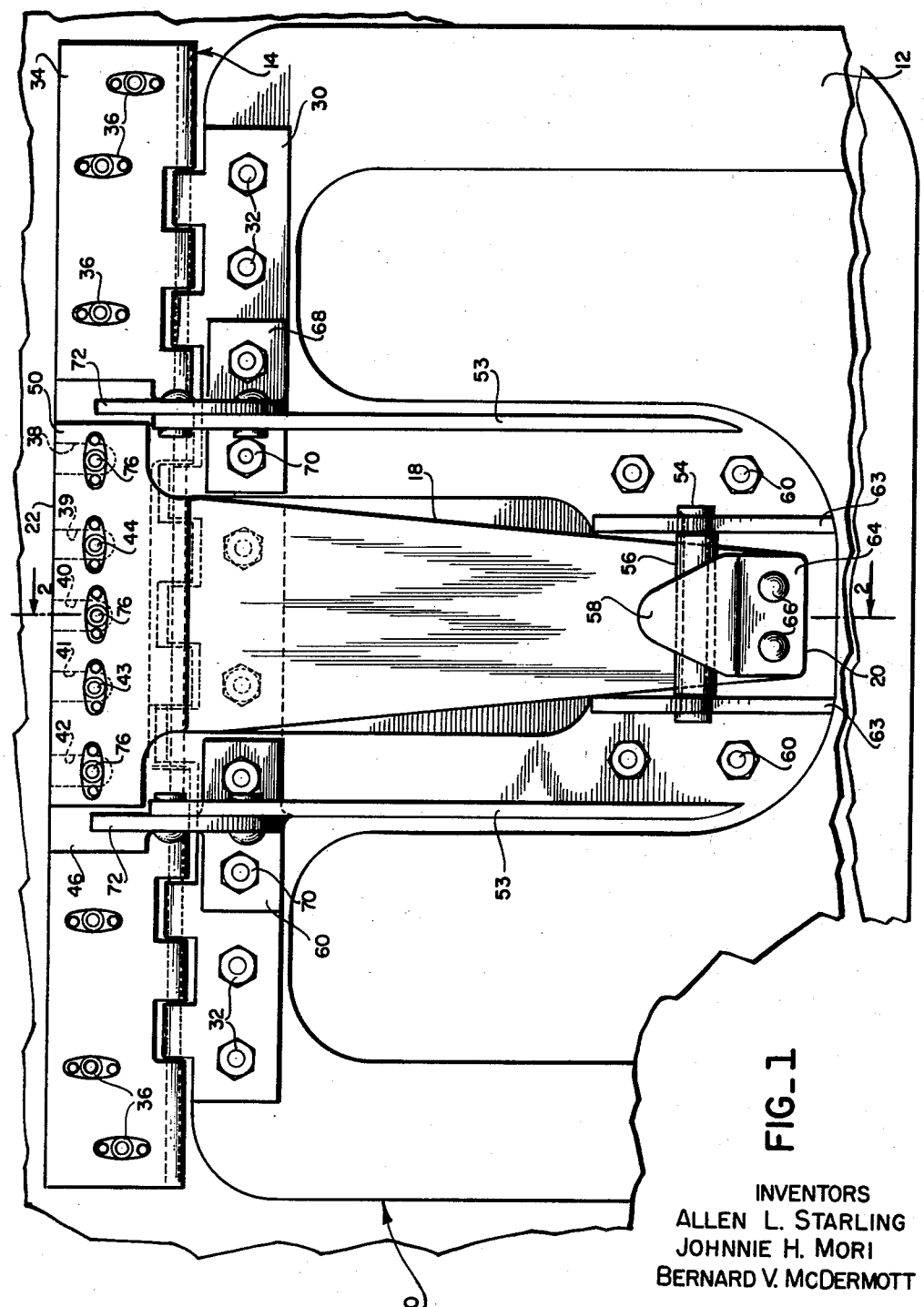
Dec. 29, 1964  A. L. STARLING ETAL  3,163,383
DUAL-PURPOSE DOOR FOR AIRCRAFT
Filed March 18, 1963  4 Sheets-Sheet 1
FIG_1
INVENTORS
ALLEN L. STARLING
JOHNNIE H. MORI
BERNARD V. MCDERMOTT
By
Agent

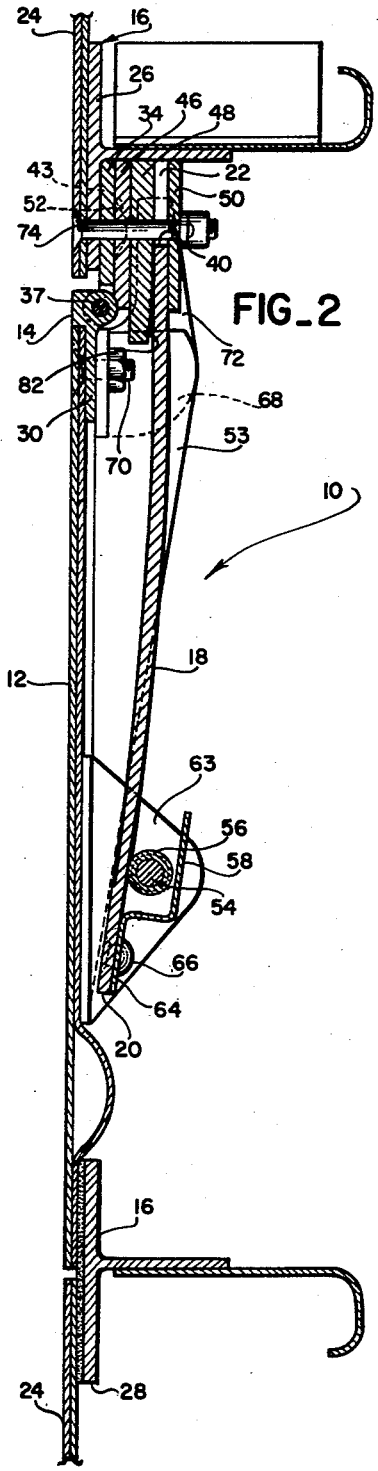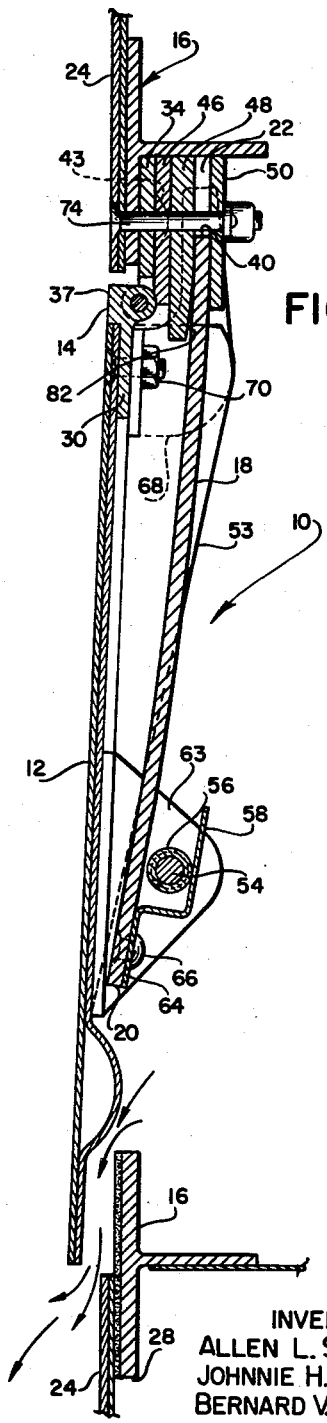

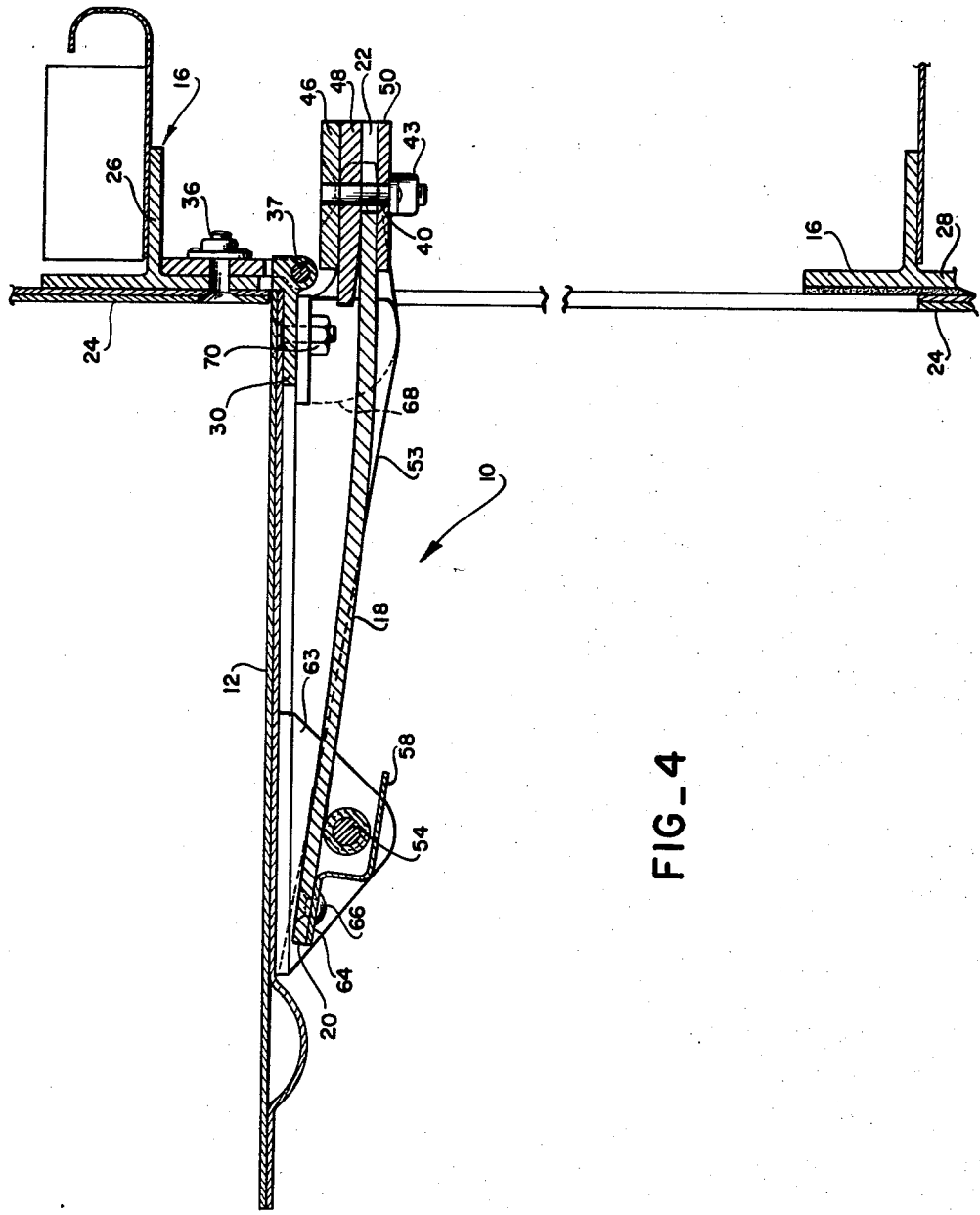

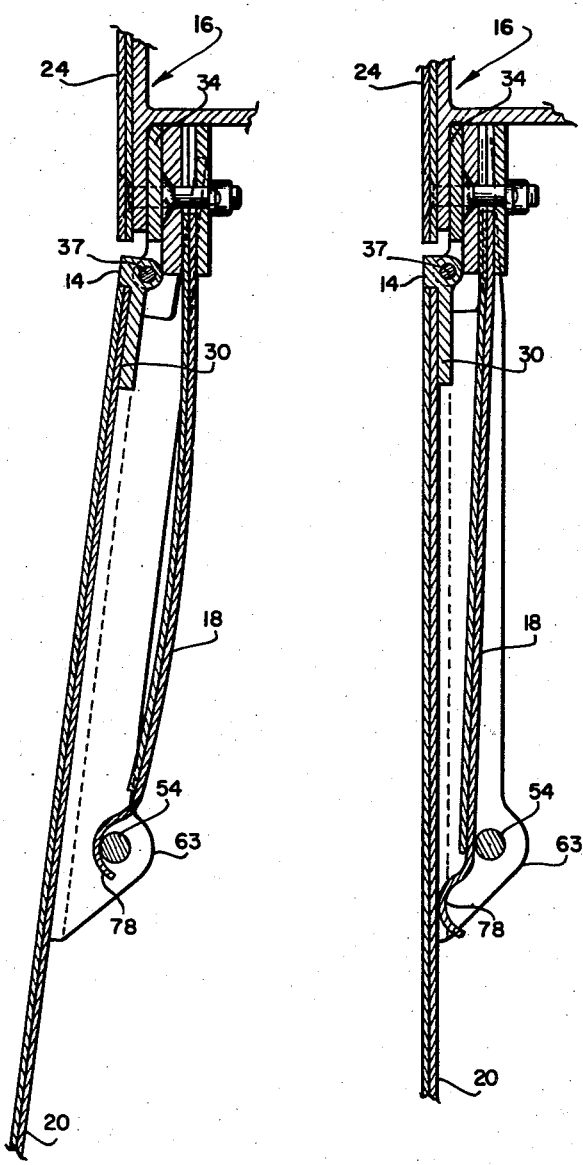

3,163,383
DUAL-PURPOSE DOOR FOR AIRCRAFT
Allen L. Starling, Los Angeles, Johnnie H. Mori, Pacoima, and Bernard V. McDermott, Los Angeles, Calif., assignors to Lockheed Aircraft Corporation, Burbank, Calif.
Filed Mar. 18, 1963, Ser. No. 265,807
7 Claims. (Cl. 244—129)

The present invention relates to a dual purpose door and more particularly to a combined access door and a pressure relief valve.

Although the dual-purpose door of the present invention may be used wherever it is desired to protect pressurized compartments or ducts, it will be described, for purposes of illustration, but not of limitation, as employed in the leading edge of the wing of an airplane.

In connection with the leading edge of an airplane wing, means must be provided for deicing it and also means must be provided for having access to the interior of the leading edge for purposes of inspecting structural members housed therein and servicing equipment housed therein.

The deicing operation on modern aircraft is performed by bleeding heated air at high pressure from one of the engines and ducting it through a plenum disposed within the leading edge of the wing to a manifold which directs the heated air against the exterior surface of the leading edge to evaporate any moisture coming in contact therewith.

Although a modulating valve is usually placed in the system to maintain the temperature and pressure of the air within safe limits, the leading edges of wings have been blown off by the air pressure building up sufficiently to rupture the plenum. This can happen when the modulating valve malfunctions or when a pipe supplying the system gives way. Consequently, it has been a problem in the prior art to provide efficient means for maintaining a safe pressure differential between the outside leading edge of a wing and the interior thereof. In the past, it has been the practice to assure that the pressure does not go beyond the structural strength of the leading edge of the wing by providing as many as 48 individual, spring-biased pressure relief valves which are mounted in individual frames along the leading edge of the wing.

Another problem in connection with aircraft resides in the necessity of inspecting and servicing equipment inside the leading edge of the wing. It is necessary to periodically inspect the structural members inside the wing and to service equipment housed therein. For this purpose, it has been the practice to employ as many as 48 separate access doors which are mounted in individual frames along the leading edge of the wing.

It is obvious that the employment of separate pressure relief valves and access doors adds to the weight of the airplane because, in such event, separate frames and hinge assemblies must also be employed. In addition, many fasteners are required to secure the separate doors in a closed position and the fabrication of the frames adds to the cost of fabricating the wing.

It will also be appreciated that considerable engineering design time is required for incorporating such a plurality of doors into the airplane structure.

It has not been possible to employ spring-biased pressure relief doors as access doors because the spring will not permit them to be opened far enough to gain access.

In view of the foregoing factors and conditions characteristic of access doors and pressure relief valves which are individually mounted in separate frames on the leading edge of an aircraft wing, it is a primary object of the present invention to provide a combined access door and pressure relief valve not subject to the disadvantages enumerated above and having a unique hinge structure designed for adapting a single door to serve both as a pressure relief valve and as an access door which is economical to manufacture and may be used efficiently, safely and expeditiously.

Another object of the invention is to provide an improved pressure responsive device for protecting pressurized compartments.

Still another object of the present invention is to provide an improved access door for pressurized compartments.

A further object of the present invention is to provide a pressure relief valve employing a leaf spring whose preload may be adjusted without replacing the spring.

Yet another object of the present invention is to provide a pressure relief valve employing a leaf spring in such a manner that the valve will open due to a predetermined air pressure and the same pressure will continue to open the valve uniformly.

According to the present invention, a dual-purpose door is mounted in a single frame with a single hinge in such a manner that the door will swing about the hinge and open as doors normally do. The hinge employed resembles a butt hinge having one portion connected to the door and the other portion connected to a suitable framing member.

A leaf spring is then employed to bias the door to a closed position and has its inner end connected to the door and its outer end connected to the portion of the butt hinge which is secured to the framing member. When it is desired to open the door for inspection purposes, the normal operation of the leaf spring will not permit sufficient access. Therefore, the outer end of the leaf spring is released from the portion of the butt hinge which is secured to the framing member so that both ends of the leaf spring will remain in a plane parallel to the plane of the door as it is pivoted about the hinge.

A wedge having a predetermined shape is placed beneath the outer end of the leaf spring and is contoured in such a manner that the preload of the spring can be adjusted and so that a predetermined pressure will continue to open the door without being resisted by the load of the spring too soon.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a plan view of the internal side of a dual-purpose door of the invention;

FIGURE 2 is a cross-sectional view taken along line 2—2 of FIGURE 1;

FIGURE 3 is a cross-sectional view, similar to FIGURE 2, with the door of FIGURE 1 shown in a pressure relieved position;

FIGURE 4 is a cross-sectional view, similar to FIGURE 2, of the door of FIGURE 1 in a fully opened position;

FIGURE 5 is a cross-sectional view of an alternate embodiment of an outer portion of the door; and FIGURE 6 is a view of the FIGURE 5 embodiment in an actuated condition.

Referring again to the drawings, the dual-purpose door constituting the present invention, generally designated 10, includes a door member 12 which is swingably mounted by means of a butt hinge 14 in a frame 16. The door 12 is maintained in its closed position by means of a leaf spring 18 having its outer portion 20 connected to the door 12 and its inner portion 22 connected to the frame 16 in a manner to be hereinafter described.

The frame 16 is mounted, for example, in the leading edge of an airplane wing 24 and includes an upper header 26 and a lower header 28.

The hinge 14 has a lip 30 connected to the door member 12 by means of screws 32 and a lip 34 connected to the upper header 26 by means of screws 36. The lips 30 and 34 of hinge 14 are pivotally connected together by means of pin 37.

The inner portion 22 of the spring 18 includes a plurality of slotted apertures 38, 39, 40, 41 and 42. The apertures 39 and 41 straddle bolts 43 and 44 which rigidly clamp the inner portion 22 of spring 18 between a first plate 46, a wedge 48 and a second plate 50. The bolts 43 and 44 have flat heads 52, one of which is shown in FIGURE 2, which are counter-sunk in the plate 46 so that the plate 46 will present a smooth surface to the lip 34 of hinge 14.

The outer portion 20 of the spring 18 is connected to the door 12 by means of a pair of brackets 53, a pin 54, a roller 56 and a lip portion 58. The forward ends of the brackets 53 are secured to the door 12 by means of suitable bolts 60 and the pin 54 passes through apertures 62 in the upstanding legs 63 of the forward ends of brackets 53 with the roller 56 being rotatably mounted on the pin 54 intermediate the legs 63. The lip 58 includes an offset portion 64 which is attached to the outer portion 20 of spring 18 by means of bolts 66. The outer portion 20 of the spring 18 extends under the roller 56 and the lip 58 extends above the roller 56 forming a rolling connection between the spring 18 and the door 12.

The rear portions 68 of the brackets 53 are secured to the lid 12 along lip 30 of the butt hinge 14 by means of bolts 70 and include fingers 72 which are engageable with the plate 46 to bring it into engagement with the lip 34 of the hinge 14 against the bias of the spring 18 when the door 12 is closed. It is to be noted that the structure just described does not connect the spring 18 to the frame 16 and, thus, the spring would remain substantially parallel to the door 12 even though the door be pivoted through 90°, as shown in FIGURE 4.

The assembly comprising the plate 46, the wedge 48, the inner portion 22 of the spring 18 and the plate 50 may be secured to the frame 16 by inserting three bolts, one of which is shown at 74 in FIGURES 2 and 3, through the leading edge of the wing 24, the upper header 26, the lip 34 of the hinge 14, the plate 46, the wedge 48, the slotted apertures 38, 40 and 42 of spring 18, and the plate 50 to threadedly engage nuts 76, which are rigidly affixed to the plate 50, with the bolts 74. The spring 18 then acts to bias the door 12 to its closed position wherein the door 12 will function as a pressure relief valve. When the pressure within the wing 24 acting on the door 12 exceeds a predetermined amount, overcoming the bias of the spring 18, the door 12 will move to the relieved position shown in FIGURE 3. When the inner portion 22 of the spring 18 is secured to upper header 26 in the manner just described, the lip 58, through the interaction of the spring 18, will prevent door 12 from opening more than a limited amount. Therefore, when it is desired to gain access to the interior of wing 24, the three bolts 74 must be removed. The bolts 74 may be placarded to indicate that they are the only three that need be removed when it is desired to open the door 12 for access to the interior of wing 24. When the door 12 is closed after having been opened for access to the wing 24, the fingers 72 will force the plate 46 back into engagement with the lip 34 of the hinge 14 against the bias of spring 18.

The wedge 48 has a sloped forward portion 82 which serves to control spring 18 in such a manner that door 12 opens smoothly with the same interior pressure.

In use, the three bolts 74 are employed to maintain the portion 22 of the spring 18 in rigid connection with the header 26 on one side of the hinge pin 37 while the portion 20 of the spring 18 is maintained in engagement with the sleeve 56. Spring 18 will then bias the door 12 to its closed position. When pressure inside the wing 24 acting on the inside of the door 12 becomes great enough to overcome the bias of the spring 18, the door 12 will open to relieve the pressure before it builds up sufficiently to damage the wing 24. Once the excessive pressure condition has been eliminated, spring 18 will again bias the door 12 into its closed position.

When it is desired to gain access to the interior of the leading edge of wing 24, the three bolts 74 are removed, eliminating the connection between the portion 22 of the spring 18 and the header 26 so that the door may be swung on the hinge 14 through a 90° arc without any interference from the spring 18. When the door 12 is closed, the fingers 72 engage the plate 46, causing it to engage the lip 34. The bolts 74 may then be replaced so that the door 12 will again act as a relief valve.

Although it is sometimes desirable to utilize a roller such as roller 56 upon the pin 54, it has been found that this part may be eliminated without detriment. In such case, the pin 54 is usually allowed to rotate freely within the apertures 62.

An alternative embodiment of the outer portion 20 of the spring is illustrated in FIGURES 5 and 6. Therein, the lip portion 58 previously described is eliminated and a hook-like pin receptacle 78 is provided in the extremity of the spring 18. When the door member 12 swings open resultant from pressure buildup, relative movement of the outer portion 20 of the spring 18 with respect to the bracket 63 and the pin 54 takes place since the door member 12 is pivoted about a hinge point and the inner portion 22 of the spring 18 remains stationary. Therefore, the outer portion of door member 12 moves outward with respect to the receptacle 78, carrying the pin 54. Eventually the relative movement results in an engagement of the pin 54 in the receptacle 78, as shown in FIGURE 5. This provides means whereby the door is prevented from opening more than a predetermined amount. The natural resiliency of the spring 18, in addition to the force of air passing over the wing, serves to close the door once the internal pressure is relieved.

While the particular dual-purpose door herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

What is claimed is:

1. In combination with the leading edge of an airplane wing, a dual-purpose door for controlling the pressure within said wing and permitting access to the interior of said wing comprising:
   (a) a door member swingably mounted in an opening in said leading edge for controlling access to said wing and for relieving excess pressure from the interior of said wing; and
   (b) resilient means having one end connected to said door member and another end connected to said leading edge for biasing said door member against the pressure within said wing a predetermined amount, said other end being releasable from said leading edge for freeing said door member to swing without restraint, said resilient means comprising a leaf spring having one end pivotally connected to said door member and another end clamped between first and second plates, said second plate being engageable with said leading edge and movable relative thereto for releasably securing said other end to said leading edge.

2. The combination of claim 1 having a pin horizontally mounted on said door member, said leaf spring comprising a lip portion extending to a point superjacent said pin to form said pivotal connection.

3. The combination of claim 1 including:
   (a) finger means having a base portion rigidly affixed to said door member adjacent said other end of said spring and another portion engageable with said second plate to bring it into engagement with said leading edge when said door member is closed.
4. The combination of claim 1 having a pin horizontally mounted on said door member, means upon said leaf spring engageable by said pin for preventing opening of said door more than a predetermined amount.
5. The combination of claim 1 having detent means mounted on said door, and means upon said leaf spring adapted for engagement by said detent means to control the extent of door opening.
6. In an aircraft wing having a leading edge, the improvement comprising:
   (a) a frame forming an opening in said leading edge, said frame including an apertured header;
   (b) a door member pivotally connected to said header for closing said opening, said door member being adapted to swing about its pivotal connection sufficiently to afford access to the interior of said wing through said opening and to serve as a pressure relief valve to relieve excess pressures building up in said leading edge;
   (c) a leaf spring having one end pivotally connected to said door and another end positionable adjacent said header;
   (d) a plate connected to said other end of said spring;
   (e) finger means rigidly connected to said door adjacent said other end of said spring for engaging said plate to bring said plate into engagement with said header when said door member is closed; and
   (f) threaded nut means rigidly affixed to said plate and being positionable over the apertures in said header for selective engagement by bolt means to rigidly connect said other end of said spring to said header at predetermined times.
7. A dual-purpose door for controlling the pressure within a pressurized chamber and for permitting access to said chamber comprising:
   (a) a door member swingably mounted in an opening in an exterior wall of said chamber for controlling access to said chamber and for relieving excess pressure from the interior of said chamber; and
   (b) resilient means having one end connected to said door member and another end connected to the exterior wall of said chamber for biasing said door against the pressure within said chamber a predetermined amount, said other end being releasable from the exterior wall for freeing said door member to swing without restraint, said resilient means comprising a leaf spring having one end pivotally connected to said door member and another end clamped between first and second plates, said second plate being engageable with the exterior wall and movable relative thereto for releasably securing said other end to the leading edge.

References Cited in the file of this patent
UNITED STATES PATENTS

| | | |
|---|---|---|
| 756,869 | Mansfield | Apr. 12, 1904 |
| 2,748,855 | Siems et al. | June 5, 1956 |
| 2,767,735 | Darling | Oct. 23, 1956 |
| 2,774,116 | Wolverton | Dec. 18, 1956 |
| 3,013,579 | Gilliam | Dec. 19, 1961 |